ZERO FLAP ANGLE
CLOSE DOWN

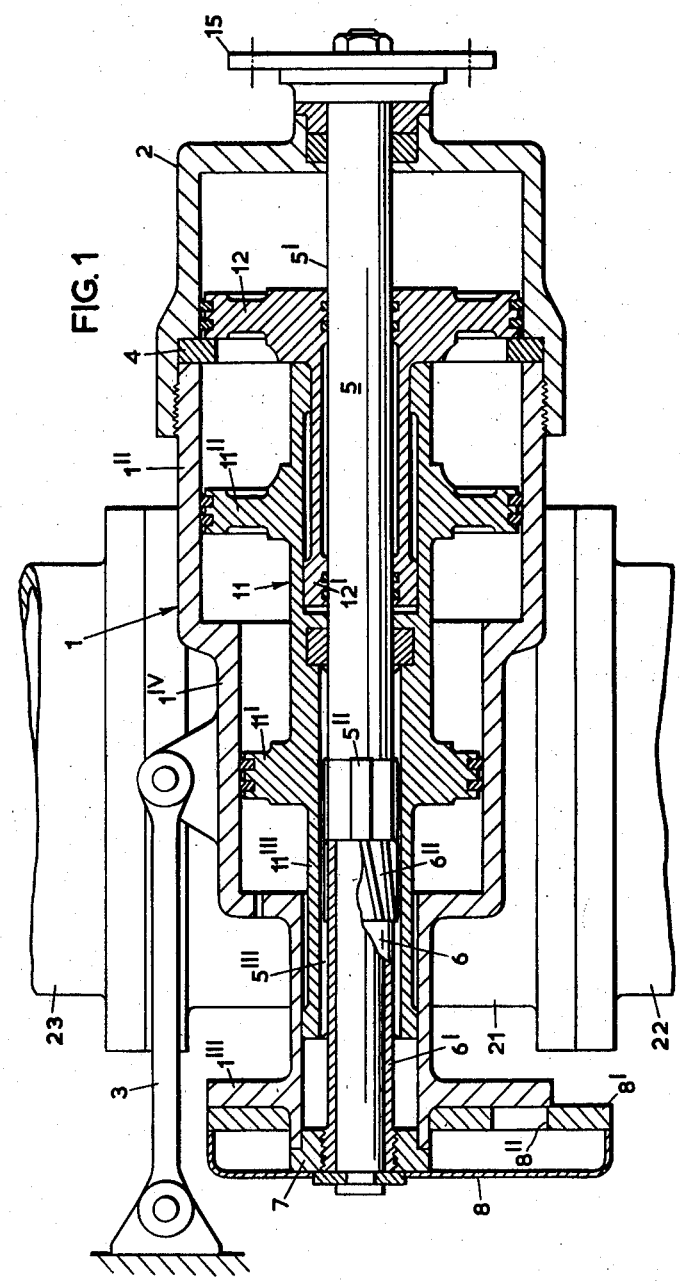

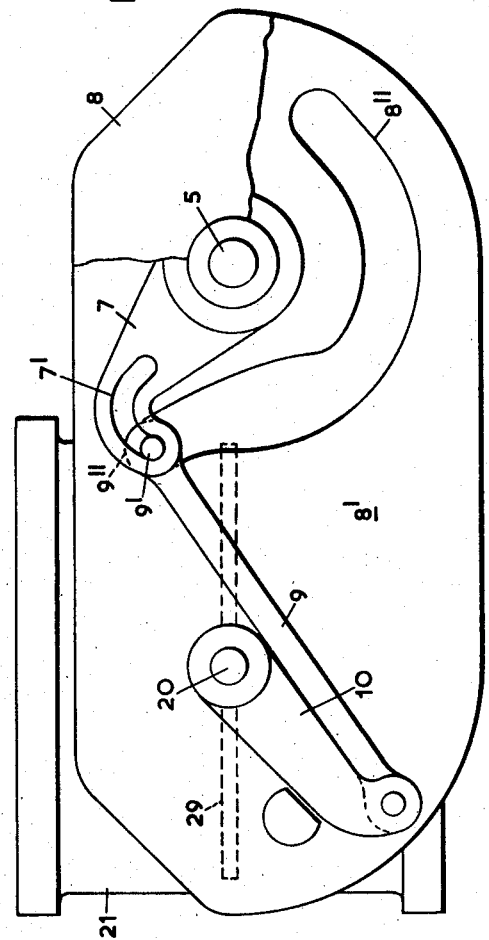

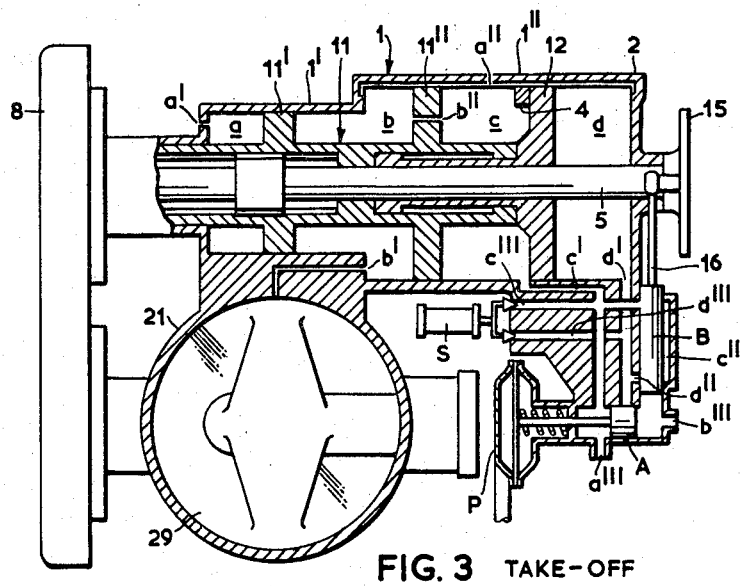
FIG. 3  TAKE-OFF
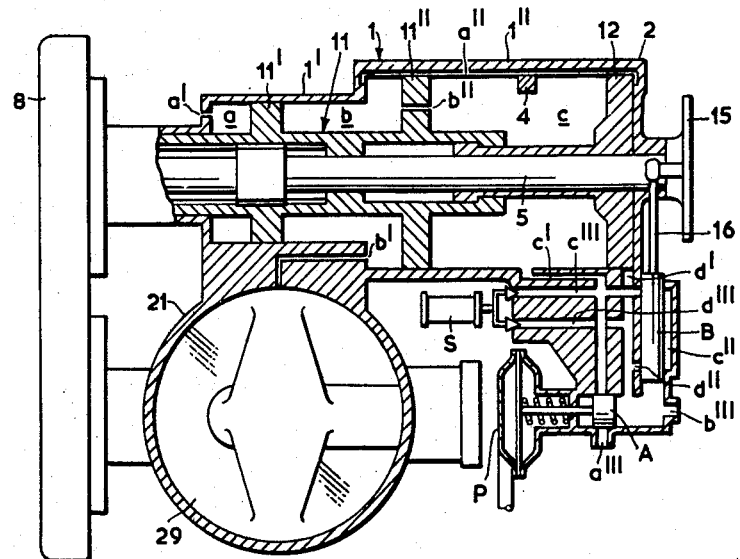
FIG. 4  LANDING OR
TAKE-OFF 'BOOST'
(FLAP ANGLE LESS THAN 40°)

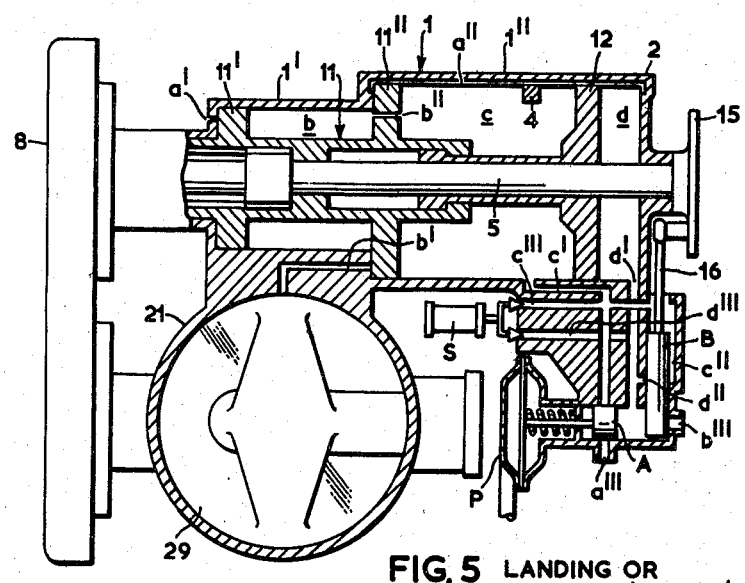
FIG. 5 LANDING OR
TAKE-OFF 'BOOST'
(FLAP ANGLE MORE THAN 40°)
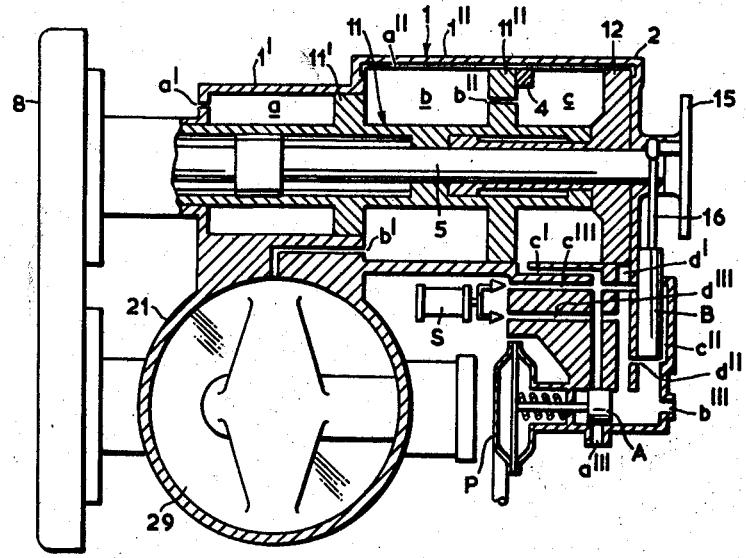
FIG. 6 CLOSE DOWN

20° FLAP ANGLE
TAKE-OFF

35° FLAP ANGLE
TAKE-OFF

50° FLAP ANGLE
TAKE-OFF

20° FLAP ANGLE
LANDING

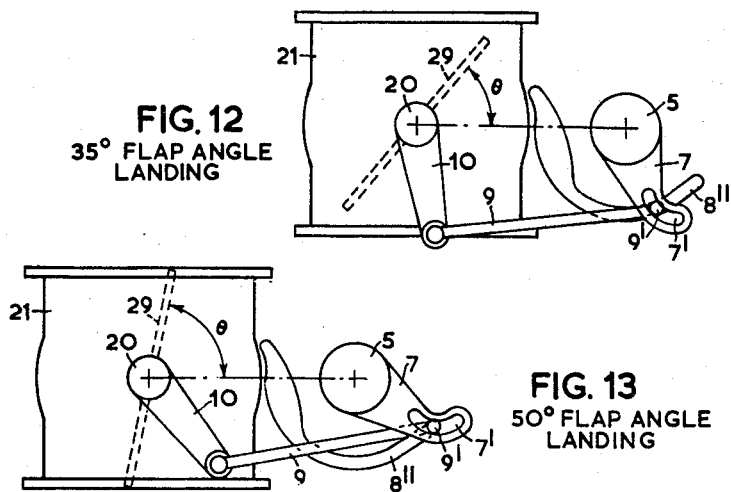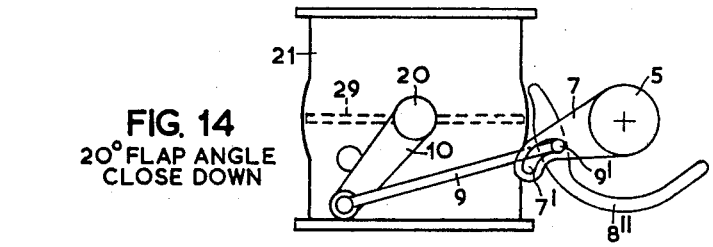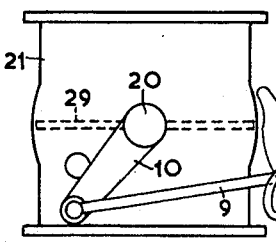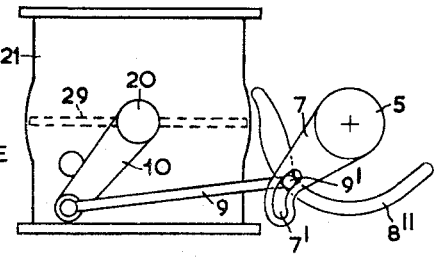

Oct. 20, 1964  L. H. PIPER ETAL  3,153,522
CONTROL OF BLOWN FLAPS FOR AIRCRAFT
Filed May 14, 1962  8 Sheets-Sheet 7

United States Patent Office 3,153,522
Patented Oct. 20, 1964

3,153,522
CONTROL OF BLOWN FLAPS FOR AIRCRAFT
Leslie Herbert Piper, Preston, and Thomas Jones, Warton, near Preston, England, assignors to The English Electric Company Limited, London, England, a British company
Filed May 14, 1962, Ser. No. 194,541
Claims priority, application Great Britain, July 11, 1961, 25,148/61
5 Claims. (Cl. 244—42)

The present invention relates to the control of blown flaps for aircraft in which such flaps are used as high-lift devices for take-off and landing. The angular deflection of the flaps and the air flow blown over the same have to be co-ordinated differently for the actual flight conditions namely of normal take-off, landing and partial failure of air supply on take-off. Also the blowing air has to be shut off for cruising or in some emergency conditions.

Moreover the air for blowing is usually derived from more than one source of supply, say from tappings of the compressors of the gas turbine jet propulsion engines of a twin- or multi-engined aircraft. The air supply from these sources has to be equally distributed over port and starboard flaps and has to be kept working in case of failure of one or some of these sources.

According to the invention the flap to be blown is mechanically linked to a control unit having pneumatic pistons one of which is mechanically linked to a butterfly valve controlling the blowing air supplied to said flap, the position of these pistons and their linkage to the said butterfly valve being controlled mechanically from the linkage to said flap and pneumatically by the pressure of the blowing air upstream of the said butterfly valve.

An electrical override under the manual control of the pilot is provided which can cut off the supply of blowing air to the flaps, if required.

Each control unit is pneumatically in communication with the upstream air pressure of the other control unit in order that failure of the source or sources of blowing air controlled by one unit will cause the other unit controlling the remaining source or sources to maintain the correct air supply to both port and starboard flaps. If this occurs, the condition is hereinafter referred to as "take-off boost."

In order that the invention may be clearly understood and readily carried into effect an embodiment thereof will now be described by way of example with reference to the accompanying drawings in which:

FIG. 1 is a plan view in longitudinal section of the cylindrical piston housing of the control unit according to the invention.

FIG. 2 is an end view to FIG. 1, showing linkage connecting said control unit to a butterfly valve.

FIGS. 3 to 6 are diagrammatic longitudinal elevations of the control unit and of the butterfly valve controlled by it in section perpendicular to FIG. 1, in various operational conditions namely FIG. 3 for take-off FIG. 4 for landing and take-off "boost" at a flap angle below 40°

FIG. 5 for landing and take-off "boost" at a flap angle exceeding 40°

FIG. 6 for close down.

Figure 7:
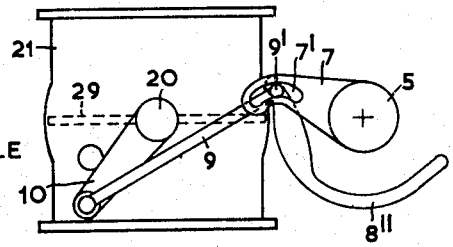

FIGS. 7 to 16 are diagrammatic end views, corresponding to FIG. 2, for various flap angles, namely FIG. 7 for zero flap angle to be considered in conjunction with FIG. 6

Figure 8:
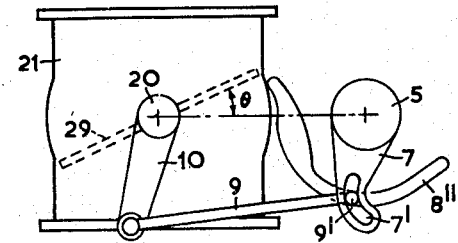
Figure 9:
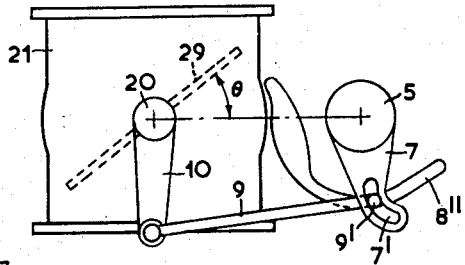
Figure 10:
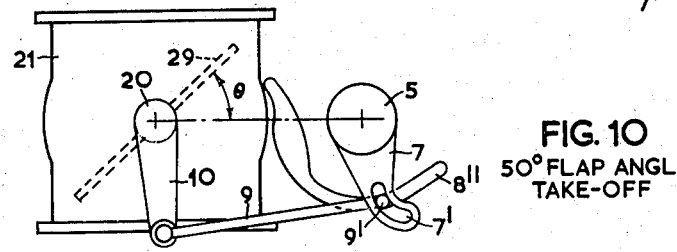

FIGS. 8 to 10 for 20°, 35° and 50° flap angle to be considered in conjunction with FIG. 3

Figure 11:
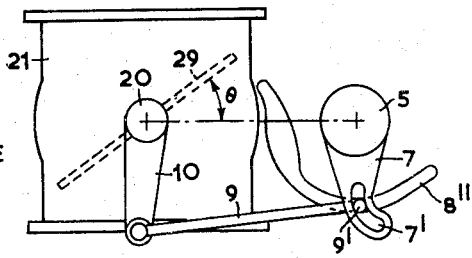

FIGS. 11 and 12 for 20° and 35° flap angle to be considered in conjunction with FIG. 4

FIG. 13 for a flap angle of 50° to be considered in conjunction with FIG. 5, and FIGS. 14 to 16 to be considered in conjunction with FIGS. 6 and 7, FIG. 7 being for zero flap angle, FIG. 14 for 20°, FIG. 15 for 35°, and FIG. 16 for 50°

Figure 17:
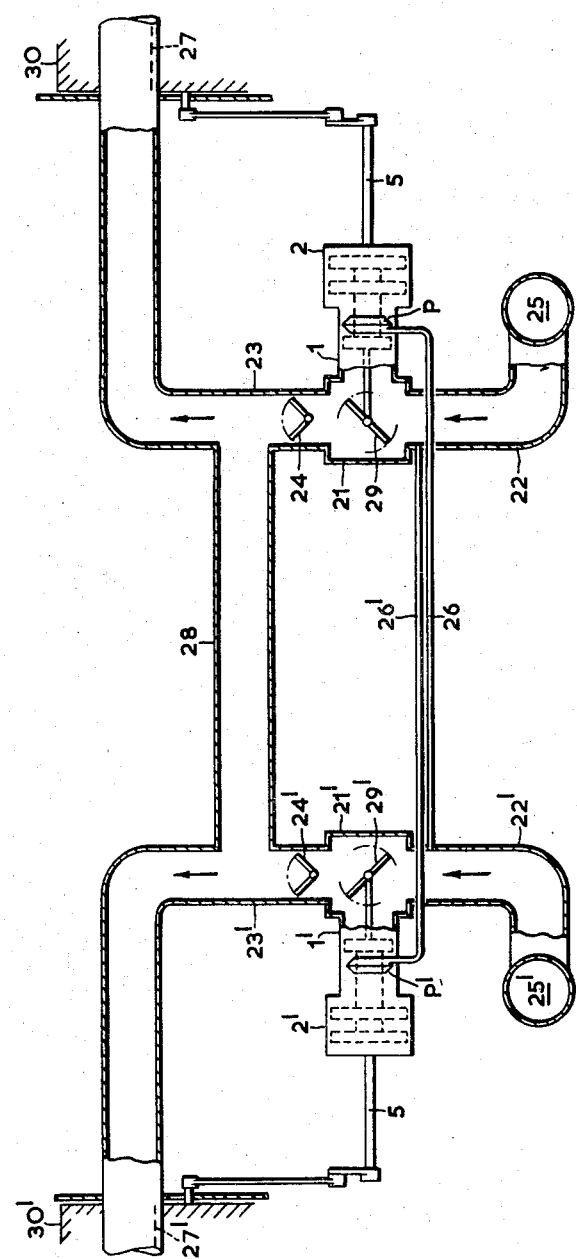
Figure 18:
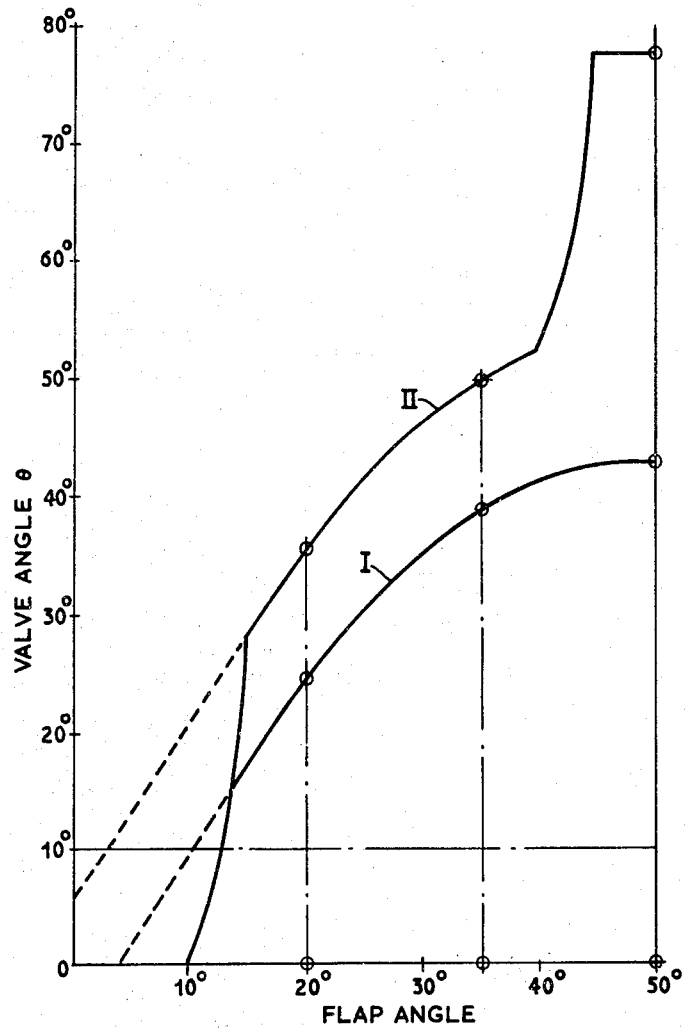

FIG. 17 is a diagrammatic general arrangement in plan view, showing two control units according to FIG. 1 in conjunction with a port- and a starboard-blown flap FIG. 18 is a graph plotting the angle $\theta$ of the butterfly valve against flap angle for take-off and landing and take-off "boost" conditions.

The control unit (FIG. 1) consists of a primary housing 1 and a secondary housing 2 screwed to the primary one. The primary housing 1 is tied to the aircraft structure by a tie rod 3 articulated to both said housing 1 and to the aircraft structure. The primary housing 1 contains two cylindrical chambers $1^{IV}$ and $1^{II}$ of different diameter. A differential primary piston $11^{I}$, $11^{II}$ is slidable in these chambers $1^{IV}$, $1^{II}$. A secondary piston 12 of the same diameter as the larger portion $11^{II}$ of the primary piston is movable co-axially with the later in the secondary housing 2, its stroke to the left in FIG. 1 being limited by a ring 4, which limits also the stroke of the primary piston $11^{I}$, $11^{II}$ to the right. A collar $12^{I}$ of the secondary piston 12 is slidable in a bore of the primary piston 11 within limits defined by internal shoulders of the latter.

Both the primary and secondary pistons are mounted co-axially on a central torque shaft 5, which on its right hand side end in FIG. 1 carries a flange 15 and is coupled to one of the flaps as will be described later with reference to FIG. 17. This central torque shaft has from right to left in FIG. 1 a smooth cylindrical portion $5^{I}$, a parallel splined portion $5^{II}$. The smaller diameter portion $11^{I}$ of the differential primary piston 11 is fixedly connected (on its left in FIG. 1) to a primary piston sleeve $11^{III}$ having over a length of its interior cross-cut helical and parallel spline grooves $5^{III}$ capable of co-operating with the parallel splines $5^{II}$ of the central torque shaft 5, and with helical splines $6^{II}$ of another sleeve 6 which is arranged co-axially with the primary piston sleeve $11^{III}$ and has also a smooth portion $6^{I}$. Piston rings and packings provide the usual seals.

At the end of the sleeve 6 a lever 7 is keyed, which is covered by a shroud 8 (FIGS. 1 and 2) detachably fixed to a flange $1^{III}$ of the primary housing, on which also a guide slot plate $8^{I}$ is fixed having a guide slot $8^{II}$. The said lever 7 is articulated by a connecting rod 9 to a lever 10 keyed to the shaft 20 of a butterfly valve 29 arranged in a casing 21, which will be described in more detail with reference to FIGS. 3–16.

This casing 21 is flanged between two air ducts 22, 23 to be described later in more detail with reference to FIG. 17.

The connecting rod 9 has a pin $9^{I}$ engaging with an idling slot $7^I$ on the lever 7 and co-axial to it a roller $9^{II}$ engaging the guide slot $8^{II}$ in the guide slot plate $8^I$. This constitutes a mechanical lost-motion linkage.

Referring now to FIGS. 3 to 6, the smaller portion $11^I$ of the differential primary piston defines at its left in the corresponding cylinder portion $1^{IV}$ an annular chamber $a$ which is vented to the ambient atmosphere through an orifice at $a^I$. Between the two portions $11^I$ and $11^{II}$ of the primary piston 11 a space $b$ is enclosed which may vary between being partly in both cylinder portions $1^{IV}$ and $1^{II}$ of the primary cylinder 1 (FIGS. 3 and 4), in the cylinder portion $1^{IV}$ only (FIG. 5) or in the cylinder portion $1^{II}$ only (FIG. 6). This space $b$ is in communication with the casing 21 upstream of the butterfly valve 29 through a restricted duct $b^I$.

Between the larger portion $11^{II}$ of the primary piston 11 and the secondary piston 12 a space $c$ is enclosed, which is in communication with the space $b$ through a restricted orifice $b^{II}$ in the portion $11^{II}$ of the primary piston 11. Between the secondary piston 12 and the end wall of the secondary cylinder 2 a space $d$ is enclosed.

The spaces $b$ and $d$ are connected by a restricted duct $a^{II}$ to one another. Spaces $c$ and $d$ are connected by vent ducts $c^I$ and $d^I$, respectively to a dual selector valve. The latter consists of a piston slide valve A spring-biased to the left in FIGS. 3 to 6, and connected to the diaphragm of a pneumatic capsule P, by which it can be forced to the right against said spring bias; and of a piston slide valve B eccentrically articulated by a rod 16 to the flange 15 of the main torque shaft 5 of the control unit (FIG. 1).

The piston slide valve A controls the outlets of the said vent ducts $c^I$, $d^I$, alternately disclosing one and opening the other one to an orifice $a^{III}$ or $b^{III}$ leading to the ambient atmosphere. The piston slide valve B controls two branch vent ducts $c^{II}$, $d^{II}$ of the vent ducts $c^I$, $d^I$, respectively, as well as the orifice $b^{III}$ to the ambient atmosphere. The outlets of the branch ducts $c^{III}$, $d^{III}$ are controlled by two needle valves operated by a solenoid S, under the pilot's manual control by means of an electrical circuit (not shown).

Referring now to FIG. 17 the pneumatic capsules P and $P^I$ of the starboard 1, 2 and port control units $1^I$, $2^I$ respectively are connected by pipes 26, $26^I$ to ducts $22^I$, 22, respectively, connecting a tapping $25^I$, 25 from the port and starboard engine, through the butterfly valve $29^I$, 29 to the duct $23^I$, 23 leading to the blowing nozzles $27^I$, 27 of the port and starboard trailing edge flap $30^I$, 30. Non-return valves 24, $24^I$ opening towards the nozzles 27, $27^I$ are built into the ducts 23, $23^I$. An equalising duct 28 connects the ducts 23, $23^I$ to one another downstream of the non-return valves 24, $24^I$.

Referring now to FIG. 18, the valve angle $\theta$ of the butterfly valve 29 (see FIGS. 7 to 16) is plotted against the flap deflection angle, the points for a flap angle of 20°, 35° and 50° being marked, which corresponds to FIGS. 8, 11 and 14; FIGS. 9, 12 and 15; and FIGS. 10, 13 and 16 respectively.

Graph I corresponds to the take-off condition (FIGS. 3, 8, 9, 10), while graph II corresponds to the landing and take-off boost condition (FIGS. 4, 11, 12 and 5, 13) and will be discussed in detail in conjunction with these figures.

The operation of the device according to the invention is as follows:

In any flight condition in which the flap deflection angle is less than 15° the position of the main torque shaft 5 is such (FIG. 6) that the piston valve B articulated to it by flanges 15 and 16 of the double selector valve keeps the two branch vent ducts $c^{II}$, $d^{II}$ of the two vent ducts $c^I$ and $d^I$ and the orifice $b^{III}$ open, and through them the spaces $c$ and $d$ on both sides of the secondary piston 12 are vented and piston 12 is balanced. Under the pressure from duct 22 communicated to the space $b$ through the duct $b^I$ the primary differential piston 11 is pushed to the right until it abuts the shoulder 4. This axial movement of the primary piston 11 is transmitted through the helical splines $5^{III}$ and $6^{II}$ FIG. 1 to the sleeve 6 as a rotary motion, which through the lever 7, pin $9^I$, and connecting link 9, turns the lever 10 through shaft 20 of the butterfly valve 29 into the position of FIG. 7, in which the butterfly valve is closed and no air is blown over the flap.

The same condition is reached when by the pilot's manual action the solenoid S is energised and the branch vent ducts $c^{III}$ and $d^{III}$ are opened (FIG. 6). If this solenoid control fails, the ducts $c^{III}$ and $d^{III}$ remain closed.

From FIGS. 14–16 it can be seen that with the butterfly valve 29 closed the flap is nevertheless free to be deflected to a flap angle of 20° (FIG. 14), 35° (FIG. 15) or 50° (FIG. 16). The corresponding rotation of the main torque shaft 5 is transmitted through the straight spline $5^{II}$ to the cross cut splining $5^{III}$ of the primary piston sleeve $11^{III}$, and hence through the helical splining $6^{II}$ to the sleeve 6 and lever 7 keyed to it (FIG. 1). This rotation is permitted by the movement of the pin $9^I$ in the idling slot $7^I$ of the lever 7, guided by the roller $9^{II}$ in the guide slot $8^{II}$ as shown in FIGS. 14–16.

At ordinary take-off conditions (FIGS. 3 and 7–9) the air pressure which is increased during take-off is applied from duct $22^I$ through duct 26 to the capsule P. The piston valve A is accordingly pushed to its right hand side end position, in which it blocks the vent duct $d^I$ but clears the vent duct $c^I$ which is vented through the orifice $a^{III}$. Accordingly the space $c$ is vented, while the space $b$ receives pressure through the duct $b^I$ and communicates the same to the space $d$ through $a^{II}$. The secondary piston 12 accordingly moves to the left until it abuts the shoulder 4, pushing the primary piston 11 to the middle position. This movement is transmitted through the aforesaid splining to the butterfly valve 29, opening the same by the angle $\theta$ (FIGS. 8–10) provided the flap is deflected more than 15°. As long as the flap is not deflected, the piston valve B through its linkage 15, 16 to the main torque shaft 5, is in the position of FIG. 6, venting both ducts $c^I$ and $d^I$ through the branch vent ducts $c^{II}$, $d^{II}$ and orifice $b^{III}$, and the butterfly valve 29 remains in the closed position of FIG. 7.

FIGS. 8 to 10 show how an increased flap angle transmits itself from the main torque shaft 5 through the aforesaid splining to the sleeve 6 and lever 7, the co-operation of pin $9^I$, slot $7^I$ and of the roller $9^{II}$ with the guide slot $8^{II}$ resulting in a valve angle $\theta$ increasing with increasing flap angle.

This is illustrated in FIG. 18 by the graph I.

As pointed out hereinabove, the term take-off "boost" refers to the compensating action of one control unit when responding to a failure of the air supply from the source controlled by the other unit occurring on take-off, which action automatically boosts the performance of the other air supply beyond that which would be achieved if the unit continued to throttle the air supply at its normal take-off setting. For example failure of, say, the port engine on take-off, would by the resulting loss in air pressure cause the corresponding non-return valve to close. This would isolate the port control unit and cause the blown flaps to be fully dependent on the starboard control unit for the correct supply of air. In order to maintain this correct supply of air the starboard control unit would adjust itself automatically to a "landing" setting so as to maintain a sufficient air supply from a single engine.

Landing and the identical take-off "boost" conditions will now be described in more detail. As long as the flaps are not depressed FIGS. 6 and 7 still apply. The pressure deriving from duct $22^I$ through duct 26 (FIG. 17) is too low to overcome the spring bias of capsule P, and the piston valve A is accordingly in the left hand side end position (FIG. 4) in which it clears the vent duct $d^I$ and hence vents the space $d$, through the orifice $b^{III}$ while closing the vent duct $c^I$. The branch vent ducts $c^{II}$ and $d^{II}$ are in this condition blocked by the piston valve B owing to the rotational position of the main torque shaft 5 corresponding to a flap angle of 20° (FIG. 11) or 35° (FIG. 12).

Both spaces $b$ and $c$ being pressurised through the duct $b^I$ and orifice $b^{II}$ in the piston $11^{II}$, the pistons 11 and 12 are forced apart as far as possible, since the pressure on the full face of the portion $11^{II}$ in space $c$ overrides the same pressure on the difference between the areas of the portion $11^{II}$ and the portion $11^I$ in space $b$. The primary piston is forced to the left but is restrained by piston 12 to the position shown. The corresponding position of piston 11 in conjunction with that of the main torque shaft 5 expresses itself in the opening of the butterfly valve 29 an angle $\theta$ which increases with the flap angle, see FIGS. 11 and 12 and the lower part of graph II of FIG. 18. The valve 29 closes and/or opens at a flap angle of 10°.

For landing and take-off "boost" with a flap angle exceeding 40° the pressure from duct $22^I$ transmitted to capsule P through duct 26 (FIG. 17) is the same as for landing and take-off "boost" at the smaller flap angles. However, owing to the corresponding position of the main torque shaft 5 the piston valve B is in the position shown in FIG. 5 wherein the branch vent ducts $c^{II}$ and $d^{II}$ and the vent $b^{III}$ are closed by it. Accordingly the spaces $b$, $c$, $d$ are all under equal pressure, i.e. the secondary piston 12 is balanced and the primary piston 11 can move to its left hand side end position. This movement expresses itself in the turning of sleeve 6 and lever 7 into the position of FIG. 13 where the valve angle $\theta$ is a maximum, i.e. the butterfly valve is fully open (see also FIG. 18, upper part of graph II).

In normal operation the pressure in the ducts 23, $23^I$ (FIG. 17) is balanced through the duct 28 even if the two engine tappings 25, $25^I$ do not supply accurately the same pressure. However, if one source of pressure, say $25^I$ fails at the take-off of the aircraft the capsule P of the opposite unit is relieved and the piston valve A moves under spring bias into the left hand side end position venting the space $d$ and establishing the take-off "boost" condition which is coincident with the landing setting as shown in graph II (described hereinabove with respect to FIGS. 4, 11, 12, and 5, 13) and the greater valve angle $\theta$ provides sufficient air for blowing both flaps. The non-return valve $24^I$ prevents in this case any loss of blowing air by return flow through the ducts $23^I$, $22^I$, $25^I$.

The embodiment described and illustrated is only an example of the invention which may be modified according to actual requirements within the scope of the patent claims.

What we claim as our invention and desire to secure by Letters Patent is:

1. An arrangement for the control of blown flaps used as high-lift devices for aircraft take-off and landing comprising in combination: angularly deflectable flaps, a source of blowing air, nozzles positioned relative to said flaps so as to be capable of blowing air over the same in operation, ducts connecting said source with said nozzles, a butterfly valve arranged in each of said ducts, automatic control units each associated with one of said flaps, lost motion linkage mechanically linking each of said control units with its associated flap, each said control units having pneumatic pistons one of which is mechanically linked to said butterfly valve and conduits establishing pneumatic communication between said ducts upstream of said butterfly valve and said pneumatic pistons so as to control their position by the air pressure in said ducts.

2. An arrangement for the control of blown flaps used as high-lift devices for aircraft take-off and landing comprising in combination: angularly deflectable flaps, a source of blowing air, nozzles positioned relative to said flaps so as to be capable of blowing air over the same in operation, ducts connecting said source of air with said nozzles, a butterfly valve arranged in each of said ducts, automatic control units each of which comprises a primary cylindrical housing and a secondary cylindrical housing attached thereto in alignment, said primary housing being tied to the structure of said aircraft and containing two chambers of different diameter, a primary differential pneumatic piston movable in said primary housing, a free secondary pneumatic piston of the same diameter as the larger diameter of said differential piston and movable in said secondary housing, an annular abutment arranged between said two housings and limiting the stroke of said two pistons towards one another, said secondary piston having a collar slidable in a bore of said primary piston limited by internal shoulders, a central torque shaft journalled in said housing co-axially with the same and coupled at one end with its associated flap and having in succession a smooth cylindrical portion, a parallel splined portion and another smooth portion, a sleeve also journalled in said primary housing, said sleeve surrounding part of said torque shaft and having at its outer circumference in succession a smooth portion and a helically splined portion, a sleeve projection of said primary piston having in its interior cross-cut helical and parallel spline grooves, said helical spline grooves in operation co-operating with said helical splined portion of said surrounding sleeve and said parallel splined grooves in operation co-operating with said parallel splines of said torque shaft, a lever keyed to the free end of said surrounding sleeve and having a slotted cam, a shroud fixed to said primary housing and having a guide slot, and a connecting rod pivotally attached at one end to said butterfly valve and at its other end guided in said guide slot, and having a pin engaging in said slotted cam, and conduits establishing pneumatic communication between said ducts upstream of said butterfly valve and said pneumatic pistons so as to control their position by the air pressure in said ducts.

3. An arrangement for the control of blown flaps used as high-lift devices for aircraft take-off and landing comprising in combination: angularly deflectable flaps, a source of blowing air, nozzles positioned relative to said flaps so as to be capable of blowing air over the same in operation, ducts connecting said source of air with said nozzles, a butterfly valve arranged in each of said ducts, automatic control units each of which comprises a primary cylindrical housing and a secondary cylindrical housing attached thereto in alignment, said primary housing being tied to the structure of said aircraft and containing two chambers of different diameter, a primary differential pneumatic piston movable in said primary housing, a free secondary pneumatic piston of the same diameter as the larger diameter of said differential piston and movable in said secondary housing, an annular abutment arranged between said two housings and limiting the stroke of said two pistons towards one another, said secondary piston having a collar slidable in a bore of said primary piston limited by internal shoulders, a central torque shaft journalled in said housings co-axially with the same and coupled at one end with its associated flap and having in succession a smooth cylindrical portion, a parallel splined portion and another smooth portion, a sleeve also journalled in said primary housing, said sleeve surrounding part of said torque shaft and having at its outer circumference in succession a smooth portion and a helically splined portion, a sleeve projection of said primary piston having in its interior cross-cut helical and parallel spline grooves, said helical spline grooves in operation co-operating with said helical splined portion of said surrounding sleeve and said parallel splined grooves in operation co-operating with said parallel splines of said torque shaft, a lever keyed to the free end of said surrounding sleeve and having a slotted cam, a shroud fixed to said primary housing and having a guide slot, and a connecting rod pivotally attached at one end to said butterfly valve and at its other end guided in said guide slot, and having a pin engaging in said slotted cam, conduits establishing pneumatic communication between said ducts upstream of said butterfly valve and said pneumatic pistons so as to control their position by the air pressure in said ducts, wherein said differential piston defines in said primary housing an annular chamber vented to the atmosphere, and defines between its two different diameter portions a first space in operation being partly in both chambers of said primary housing and in one of said chambers only depending on the position of said differential piston, said first space being in restricted communication with at least one of said ducts upstream of said butterfly valve, a second space enclosed in said housings between the large diameter portion of said differential piston and said secondary piston, and in restricted communication with said first space, and a third space enclosed between said secondary piston and said secondary housing, said first and third space being in restricted communication with one another, a dual selector valve spring biased in one sense and pneumatically biased in the opposite sense controlling the communication between said second and third space and the atmosphere, and a piston slide valve eccentrically articulated to said main torque shaft and controlling vents of said second and third space.

4. An arrangement for the control of blown flaps used as high-lift devices for aircraft take-off and landing comprising in combination: angularly deflectable flaps, a source of blowing air, nozzles positioned relative to said flaps so as to be capable of blowing air over the same in operation, ducts connecting said source of air with said nozzles, a butterfly valve arranged in each of said ducts, automatic control units each of which comprises a primary cylindrical housing and a secondary cylindrical housing attached thereto in alignment, said primary housing being tied to the structure of said aircraft and containing two chambers of different diameter, a primary differential pneumatic piston movable in said primary housing, a free secondary pneumatic piston of the same diameter as the larger diameter of said differential piston and movable in said secondary housing, an annular abutment arranged between said two housings and limited the stroke of said two pistons towards one another said secondary piston having a collar slidable in a bore of said primary piston limited by internal shoulders, a central torque shaft journalled in said housings co-axially with the same and coupled at one end with its associated flap and having in succession a smooth cylindrical portion, a parallel splined portion and another smooth portion, a sleeve also journalled in said primary housing, said sleeve surrounding part of said torque shaft and having at its outer circumference in succession a smooth portion and a helically splined portion, a sleeve projection of said primary piston having in its interior cross-cut helical and parallel spline grooves, said helical spline grooves in operation co-operating with said helical splined portion of said surrounding sleeve and said parallel splined grooves in operation co-operating with said parallel splines of said torque shaft, a lever keyed to the free end of said surrounding sleeve and having a slotted cam, a shroud fixed to said primary housing and having a guide slot, and a connecting rod pivotally attached at one end to said butterfly valve and at its other end guided in said guide slot, and having a pin engaging in said slotted cam, conduits establishing pneumatic communication between said ducts upstream of said butterfly valve and said pneumatic pistons so as to control their position by the air pressure in said ducts, wherein said differential piston defines in said primary housing an annular chamber vented to the atmosphere, and defines between its two different diameter portions a first space in operation being partly in both chambers of said primary housing and in one of said chambers only depending on the position of said differential piston, said first space being in restricted communication with at least one of said ducts upstream of said butterfly valve, a second space enclosed in said housings between the large diameter portion of said differential piston and said secondary piston, and in restricted communication with said first space, and a third space enclosed between said secondary piston and said secondary housing, said first and third space being in restricted communication with one another, a dual selector valve spring biased in one sense and pneumatically biased in the opposite sense controlling the communication between said second and third space and the atmosphere, and a piston slide valve eccentrically articulated to said main torque shaft and controlling vents of said second and third space, and electrically operated valve means under the pilot's control operatively connected with said second and third spaces and capable of cutting off the supply of blowing air to said flaps, overriding said automatic control unit.

5. An arrangement for the control of blown flaps used as high-lift devices for aircraft take-off and landing comprising in combination: angularly deflectable flaps, a source of blowing air, nozzles positioned relative to said flaps so as to be capable of blowing air over the same in operation, ducts connecting said source of air with said nozzles, a butterfly valve arranged in each of said ducts, automatic control units each of which comprises a primary cylindrical housing and a secondary cylindrical housing attached thereto in alignment, said primary housing being tied to the structure of said aircraft and containing two chambers of different diameter, a primary differential pneumatic piston movable in said primary housing, a free secondary pneumatic piston of the same diameter as the larger diameter of said differential piston and movable in said secondary housing, an annular abutment arranged between said two housings and limiting the stroke of said two pistons towards one another said secondary piston having a collar slidable in a bore of said primary piston limited by internal shoulders, a central torque shaft journalled in said housing co-axially with the same and coupled at one end with its associated flap and having in succession a smooth cylindrical portion, a parallel splined portion and another smooth portion, a sleeve also journalled in said primary housing, said sleeve surrounding part of said torque shaft and having at its outer circumference in succession a smooth portion and a helically splined portion, a sleeve projection of said primary piston having in its interior cross-cut helical and parallel spline grooves, said helical spline grooves in operation co-operating with said helical splined portion of said surrounding sleeve and said parallel splined grooves in operation co-operating with said parallel splines of said torque shaft, a lever keyed to the free end of said surrounding sleeve and having a slotted cam, a shroud fixed to said primary housing and having a guide slot, and a connecting rod pivotally attached at one end to said butterfly valve and at its other end guided in said guide slot, and having a pin engaging in said slotted cam, conduits establishing pneumatic communication between said ducts upstream of said butterfly valve and said pneumatic pistons so as to control their position by the air pressure in said ducts, wherein said differential piston defines in said primary housing an annular chamber vented to the atmosphere, and defines between its two different diameter portions a first space in operation being partly in both chambers of said primary housing and in one of said chambers only depending on the position of said differential piston, said first space being in restricted communication with at least one of said ducts upstream of said butterfly valve, a second space enclosed in said housings between the large diameter portion of said differential piston and said secondary piston, and in restricted communication with said first space, and a third space enclosed between said secondary piston and said secondary housing, said first and third space being in restricted communication with one another, a dual selector valve spring biased in one sense and pneumatically biased in the opposite sense controlling the communication between said second and third space and the atmosphere, and a piston slide valve eccentrically articulated to said main torque shaft and controlling vents of said second and third space, and solenoid actuated needle valves electrically operated under the pilot's control, and controlling vents from said second and third space to the atmosphere and capable of cutting off the supply of blowing air to said flaps, overriding said automatic control unit.

References Cited in the file of this patent

UNITED STATES PATENTS

| | | |
|---|---|---|
| 2,478,793 | Trey | Aug. 9, 1949 |
| 2,747,549 | Gerry | May 29, 1956 |
| 2,912,189 | Pouit | Nov. 11, 1959 |
| 2,969,206 | Jensen | Jan. 24, 1961 |
| 3,058,695 | Simonis | Oct. 16, 1962 |